United States Patent [19]
Morello

[11] 3,940,263
[45] Feb. 24, 1976

[54] STEELMAKING WITH INERT GAS BLOWING

[76] Inventor: Bartolomeo Morello, Via Ottorino Lazzarini n. 12, Rome, Italy

[22] Filed: Sept. 25, 1974

[21] Appl. No.: 509,223

[30] Foreign Application Priority Data
Sept. 25, 1973 Italy.................................. 52724/73

[52] U.S. Cl.......................................... 75/60; 75/59
[51] Int. Cl.².......................................... C21C 5/38
[58] Field of Search.................................. 75/59, 60

[56] References Cited
UNITED STATES PATENTS
3,649,246  3/1972  Fulton........................... 75/59

Primary Examiner—Peter D. Rosenberg
Attorney, Agent, or Firm—Young & Thompson

[57] ABSTRACT

An oxygen steelmaking process utilizing also an inert gas to reduce the oxidation of a desired element such as chromium while permitting a desirably low carbon level to be reached, is characterized by recovery and recycling of the inert gas for economy. The inert gas is preferably argon and is preferably recovered by fractional distillation so as to reduce the nitrogen in the cycle stream and to recover and store and mix and reuse the argon and oxygen as desired. After removal of dust and carbon dioxide from the effluent gases from the converter, and prior to fractionation, 10–30% of the effluent gas is mixed with a minor part of the recovered oxygen and blown beneath the hood to limit air aspiration and to aid in the combustion of CO.

6 Claims, 1 Drawing Figure

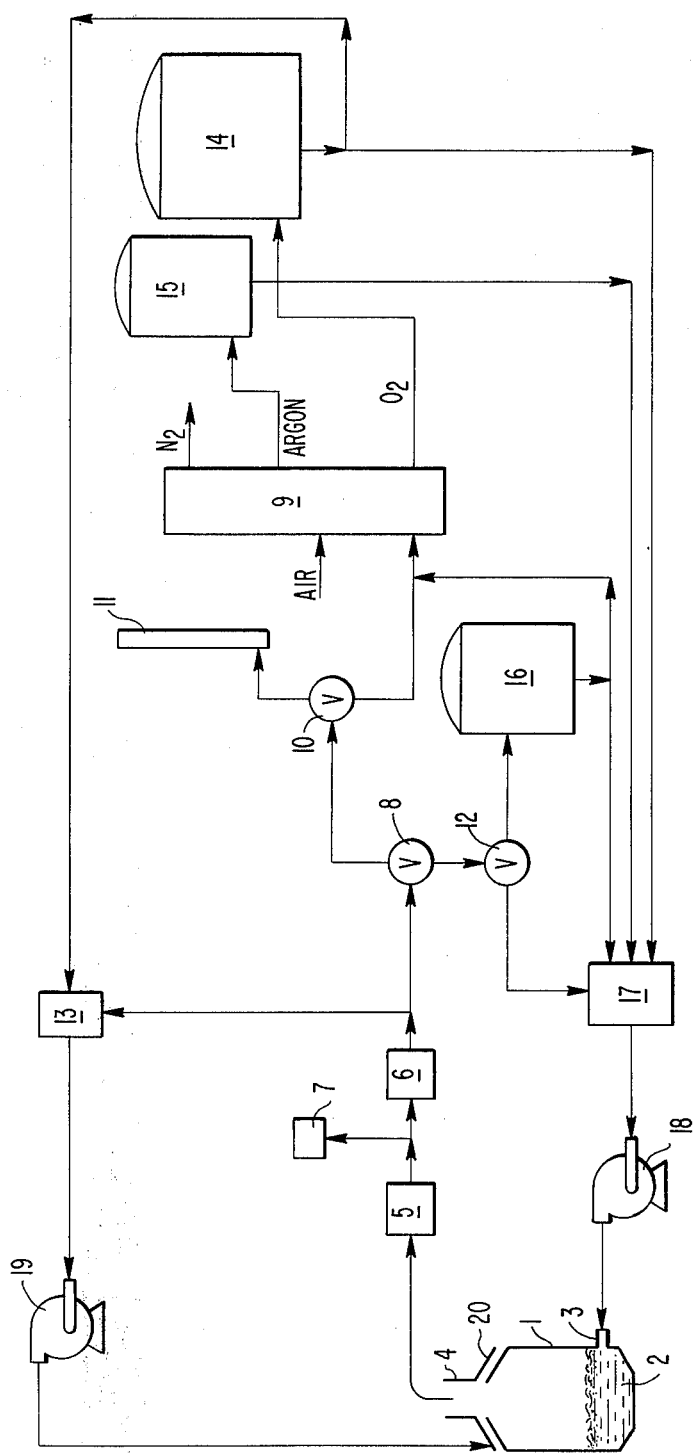

STEELMAKING WITH INERT GAS BLOWING

The present invention relates to a process for making steel, more particularly to a process in which an inert gas and oxygen are blown into the molten bath.

As is well known, in oxygen steelmaking, the oxygen oxidizes the carbon present in the metal bath, as well as other elements. However, in certain types of steel, it is necessary to prevent the oxygen from reducing or eliminating desired elements. For example, in the case of high chromium steel, which may for example contain about 10 to 18% chromium, oxygen steelmaking tends to result in a substantial oxidation of the chromium, so that oxygen blowing cannot be carried out beyond certain limits, and the resulting steel tends to have an undesirably high carbon content. This is due to the fact that, for each chromium content, there exists a corresponding carbon content for which the equilibrium constant of the reaction $C + \frac{1}{2} O_2 \rightarrow CO$ is such that the activity of the oxygen dissolved in the bath is sufficient to oxidize the chromium.

The prior art has proposed to lower the partial pressure of CO existing in the bath so as to drive the decarburization reaction to the right, as in U.S. Pat. No. 3,252,790. This can be done by adding to the oxygen a gas which is inert to the bath, so as to ensure the presence in the bath of a dispersion of small bubbles of a gas within which the CO produced by the decarburization reaction diffuses. It has thus been possible to produce high chromium steels without resort to electric furnace refining processes, thereby achieving high productivity without high cost.

The use of an inert gas has the disadvantage, however, that the cost of the inert gas is undesirably high. Nitrogen is not to be used, because it is reactive with the bath. The cheapest inert gas is argon; and when speaking of the inert gas hereinafter, reference will be had specifically to argon simply because it is the cheapest of the suitable gases. However, it is to be understood that other inert gases, more expensive than argon, can also be used if desired if for any reason the use thereof is feasible despite their ordinarily higher cost.

Accordingly, it is an object of the present invention to provide a process for reducing the cost of oxygen steelmaking when an inert gas is also used.

Another object of the present invention is the provision of a method which permits conservation of the inert gas used in a corresponding process of oxygen steelmaking.

Briefly, the objects of the invention are achieved by collecting the gases emitted from the bath during decarburization by blowing with an argon-oxygen mixture, separating from the collected gases dust and gases that can easily be eliminated such as carbon dioxide, and then recycling the gas rich in argon to the bath. This recycling is preferably done after fractionation of the gas enriched in argon, and can be accompanied by storage of gas not immediately required for the process, either before, after or in lieu of fractionation.

The contamination by air of the gases leaving the vessel is controlled by creating a curtain of gas between the converter hood and the top of the vessel. This curtain is formed by a fraction of the effluent gas itself, suitably purified and enriched in oxygen, the curtain being such that a small fraction is lost to the atmosphere while at least 80% enters the hood to burn the CO emitted from the metallic bath. It is thus possible to control the quantity of air aspirated by regulating the flow of this fraction of the gas. However, this latter has the possible drawback that the temperature rise may be too great and that complications may be introduced in the separation of argon from nitrogen in order to recycle the argon. Therefore, the latter difficulty can be overcome by diluting the oxygen of the gas curtain with gas that is unreactive to the gas leaving the converter and which has a high thermal capacity and which is easily separable from argon by chemical or physical methods, e.g. carbon dioxide or steam or the like.

Other objects, features and advantages of the present invention will become apparent from a consideration of the following description, taken in connection with the accompanying drawing, which is a diagrammatic flow sheet of the process. Referring now in greater detail to the drawing, there is shown a conventional converter 1 containing a metallic bath 2 into which a mixture of oxygen and argon is blown through tuyeres 3. The evolved gases are collected by hood 4 and sent to a conventional unit 5 for dust removal and a conventional unit 6 for the removal of $CO_2$ and any residual CO. Sampling of the gas between units 5 and 6 is conducted in a conventional gas analyzer 7 which controls a valve 8 to send the gas to a second valve 10 or a third valve 12. Again according to the composition of the gas, valve 10 sends the mixture to a fractionating unit 9 or to a chimney 11 through which it is vented to the atmosphere. Valve 12 selectively sends the gas toward a gas holder 16 or to a mixer 17 where it can be mixed with oxygen and argon coming from gas holders 14 and 15, respectively and then sent to blower 18 whence it is returned to the tuyeres 3. The control of valves such as valves 8, 10 and 12 by analyzer 7 is conventional and so need not be disclosed in greater detail.

A portion of the gas downstream of unit 6, e.g. 10–30%, can be diverted through mixer 13 in which it is mixed with oxygen from holder 14 and sent by blower 19 beneath the edge 20 of converter hood 4, at least 80% of this gas, as indicated above, admixing with the gas in hood 4, the rest escaping to the ambient atmosphere to prevent or limit air entry with its undesirable nitrogen. This gas will be rich in oxygen and so will assist in the combustion of the CO to $CO_2$.

In the fractionating unit 9 gases rich in oxygen, argon and nitrogen can be taken off at appropriate concentration levels according to well known air fractionation techniques which thus need not be elaborated. The nitrogen can be vented to the atmosphere or otherwise used, if desired after heat exchange (not shown) to recover its refrigeration, the oxygen and argon streams (which of course are not pure) proceed to the holders 14 and 15, respectively. If desired, air may also be introduced into unit 9 so as to make up unavoidable argon losses and to provide at least a portion of the consumed oxygen. Of course the various well known air separation techniques of compression, heat exchange, plural stage fractionation, expansion, reflux, etc. are not shown in the drawing in connection with unit 9 because they are merely conventional.

To enable those having ordinary skill in this art to practice the invention, the following illustrative example is given:

A 50-ton bath 2 is established in converter 1, whose composition is 14% chromium, 1% carbon, balance essentially iron. Decarburization is effected in three stages, in the first of which an argon to oxygen ratio of about 1:3 is maintained, while 14NM³/min of argon and 33NM³/min of oxygen are blown through tuyeres 3 for a period of 20 to 25 minutes. In the second stage, the argon is increased until the argon:oxygen ratio is about 1:2, and 14NM$^3$/min of argon and 28NM$^3$/min of oxygen are blown for 8 to 10 minutes. In the third stage, the argon to oxygen ratio is increased to about 2:1, and 28NM$^3$/min of argon and 14NM$^3$/min of oxygen are blown for 8 to 10 minutes. A total of about 1,200NM$^3$ of oxygen and about 750NM$^3$ of argon is blown, and the carbon removed is about 575 kg, the final carbon content being 0.04%.

The gas leaving hood 4, after combustion of CO to $CO_2$, has a total composition of about 1,200NM$^3$ $CO_2$, 850NM$^3$ argon, 12,500NM$^3$ nitrogen and 2,500NM$^3$ oxygen. The flow rate from the hood is about 25,000NM$^3$ per hour.

After removal of dust in unit 5 and $CO_2$ in unit 6, the gas is divided and about 20% sent to mixer 13, where it joins a total of 600NM$^3$ of oxgen from holder 14, this mixture than being supplied beneath hood 4. In the example in question, a considerable amount of air is aspirated beneath hood 4 in order to burn the CO and to cool the hood suitably, and so the nitrogen content of the gases leaving the hood is correspondingly high. Such a high nitrogen content would be unsuitable for introduction through tuyeres 3, and so valve 12 is closed and all the remaining gas, that is, 80% of what left unit 6, is sent by valve 8 to valve 10 and thence to fractionating unit 9 where it is separated as described above, the oxygen and argon stored and reused and the nitrogen ultimately vented.

From a consideration of the foregoing disclosure, therefore, it will be evident that the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. An oxygen steelmaking process for the selective removal of carbon from a bath of molten steel in a converter having a hood, said bath containing 10–18% by weight of chromium, comprising blowing into said bath an oxygen-argon mixture, removing dust and $CO_2$ from the effluent gases from said bath, passing one portion of said effluent gas beneath the hood of said converter thereby to reduce the flow of ambient air into said converter, and enriching another portion of said effluent gas in argon and recycling said enriched portion into said bath.

2. A process as claimed in claim 1, and removing any residual carbon monoxide from said effluent gas prior to recycling into said bath.

3. A process as claimed in claim 1, and adding oxygen to said one portion of said effluent gas.

4. A process as claimed in claim 3, in which said added oxygen is obtained by the fractional distillation of said another portion of said effluent gas.

5. A process as claimed in claim 4, in which argon and oxygen from said fractional distillation comprise said recycled gas.

6. A process as claimed in claim 1, in which said one portion of said effluent gas comprises 10 to 30% by volume of said effluent gas.

* * * * *